United States Patent [19]

Eder et al.

[11] Patent Number: 4,802,334
[45] Date of Patent: Feb. 7, 1989

[54] AUGMENTOR FUEL SYSTEM

[75] Inventors: Matthias Eder, Stuart; Walter B. Kerr, West Palm Beach, both of Fla.

[73] Assignee: United Technologies Corporation, Hartford, Conn.

[21] Appl. No.: 104,608

[22] Filed: Oct. 5, 1987

[51] Int. Cl.[4] ............................................. F02K 3/10
[52] U.S. Cl. ................................... 60/261; 60/39.141; 60/739; 137/389; 431/62; 239/65; 239/68
[58] Field of Search ............... 60/261, 39.281, 739, 60/39.141; 137/389; 123/456, 179 L, 179 G; 431/62, 64; 239/65, 63, 68; 222/63

[56] References Cited

U.S. PATENT DOCUMENTS

| | | | |
|---|---|---|---|
| 2,884,997 | 5/1959 | Bevers et al. | 60/39.141 |
| 2,892,309 | 6/1959 | Sipin | 60/39.141 |
| 3,360,940 | 1/1968 | Rimmer | 60/261 |
| 3,768,249 | 10/1973 | Lewis | 60/39.141 |
| 3,835,881 | 9/1974 | Dal et al. | 137/389 |
| 4,370,854 | 2/1983 | Williams | 60/261 |
| 4,411,137 | 10/1983 | Pearce | 60/739 |
| 4,719,750 | 1/1988 | Lemmin | 60/261 |

FOREIGN PATENT DOCUMENTS 31210 2/1983 Japan ................................. 239/63

Primary Examiner—Donald E. Stout
Attorney, Agent, or Firm—Edward L. Kochey, Jr.

[57] ABSTRACT

An optical sensor (40) located in the manifold area (20) of an augmentor senses the presence of liquid. The engine control provides a high fuel flow rate from remotely located augmentor fuel control (58) until liquid is sensed. Flow is then reduced to the desired metered rate.

5 Claims, 2 Drawing Sheets

AUGMENTOR FUEL SYSTEM

The Government has rights in this invention pursuant to a contract awarded by the Department of the Air Force.

DESCRIPTION

1. Technical Field

The invention relates to gas turbine augmentors and in particular to a fuel supply system therefore.

2. Background of the Invention

Gas turbine augmentors, also known as afterburners, are comprised of fuel spray bars located in the gas flow downstream of the turbine. Supplementary fuel is injected at this location for burning to increase the power output.

Because of the high temperature environment of augmentors, fuel controls are mounted at a remote relatively cool location. The fuel lines adjacent to the augmentor must also be maintained fuel free normally when the apparatus is shut down in order to avoid coking in the line. There is accordingly a time delay between the start of fuel flow and passage through the augmentor spray bars as the supply line fills. Such delay is unacceptable in some situations calling for immediate supplemental thrust.

Excess flow through the spray bars beyond the desired amount causes an excess back pressure and possible stall of the gas turbine engine. A problem exists in achieving a quick response without an excessive spray bar flow.

At some times the supply line may be partially filled. Any control system should be capable of taking this situation into account.

Systems which continuously recirculate fuel to keep the lines full have additional power requirements and require additional controls which add expense, complexity and weight. There also remains a potential for coking in the area of the augmentor should the recirculated flow be insufficient.

SUMMARY OF THE INVENTION

An optical sensor is located near the spray bar manifold inlet to sense whether liquid is present. The fuel control delivers fuel at a high rate until liquid is sensed at that location and then drops to the desired metered flow rate.

DESCRIPTION OF THE PREFERRED EMBODIMENT

Figure 1:
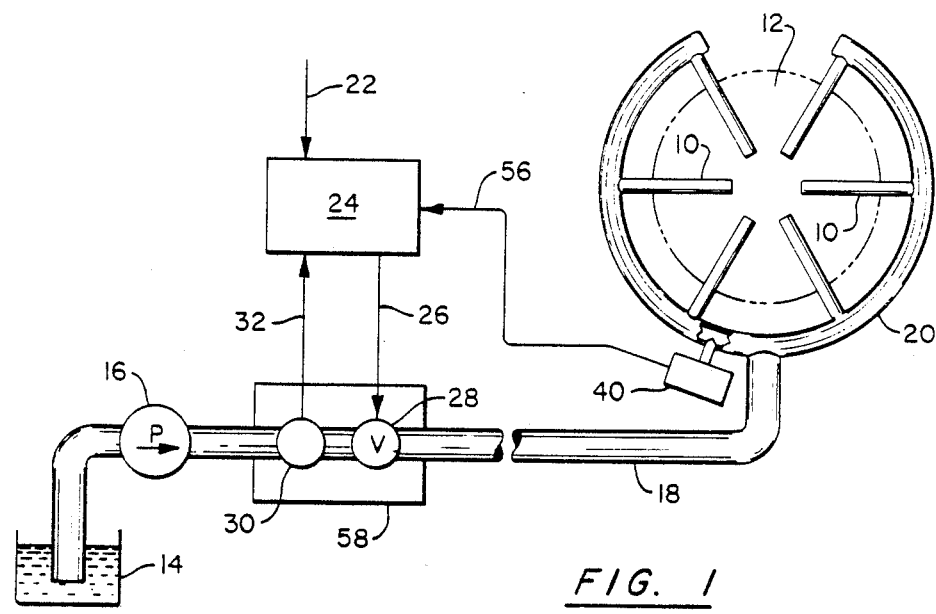
FIG. 1 is a schematic diagram of the supply system.

FIG. 1 illustrates a plurality of spray bars 10 located within the gas stream 12 of a gas turbine outlet. Fuel as required for afterburning as drawn from a fuel supply tank 14 by fuel pump 16 and delivered through conduit 18 to the spray bar manifold 20. The fuel is distributed around the manifold and discharged through openings in the spray bars 10.

In response to a desired thrust input 22 the electronic engine control 24 emits a control signal through line 26 to control valve 28. A flow meter 30 detecting the instantaneous flow rate returns a flow signal through control line 32 to the engine control 24 for appropriate comparison and adjustment to achieve the desired metered flow rate.

In accordance with normal operating procedures the conduit 18 would be drained when not operating and left empty of fuel. Accordingly, when fuel pump 16 starts a flow of liquid fuel through control valve 28 a liquid front travels through the conduit 18 to and through manifold 20. After the volume of line is filled the fuel finally begins to flow into the gas duct 12 for combustion. An optical liquid level sensor 40 of the substantially conventional type is located with a glass prism 42 within or very close to the augmentor fuel manifold 20. An LED light source 44 passes light through the fiber optic cables 46 where it is directed to a first face 48 of the prism. When the prism is immersed in liquid the index of refraction is such that the light ray is reflected to the downstream face 50 of the prism and upwardly through fiber optic cable 52 to a photo transistor light detector 54. A control signal is sent through control line 56 back to the engine control 24.

Figure 3:
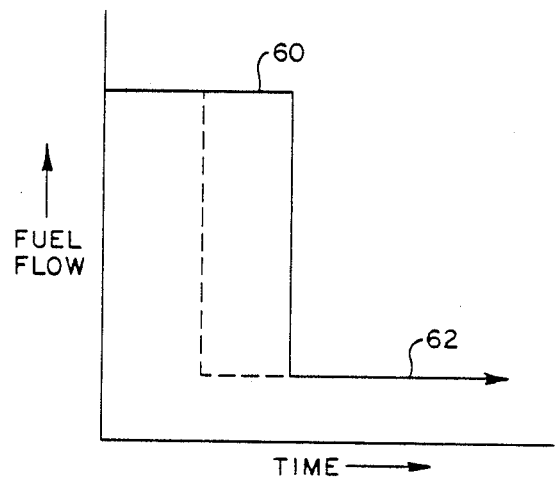
FIG. 3 is a curve showing the fuel delivery rates.
Figure 2:
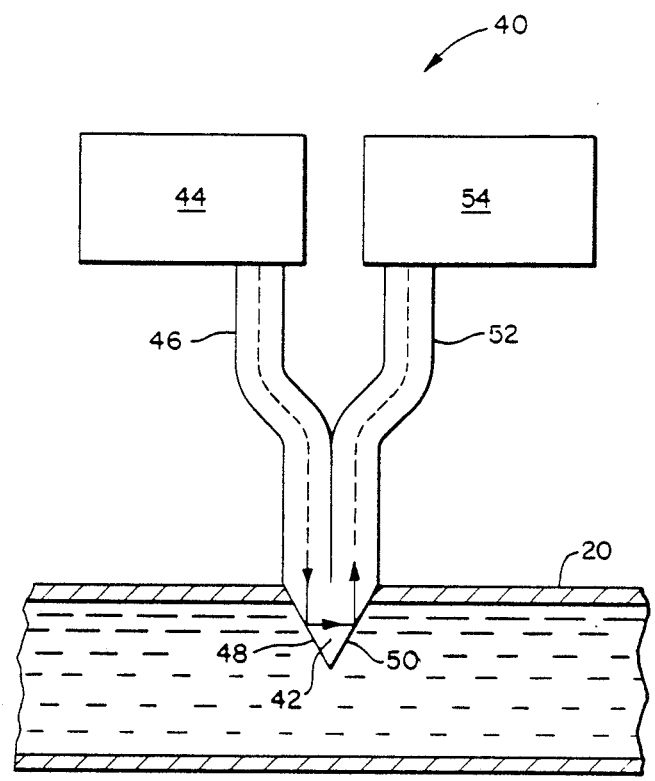
FIG. 2 is a view of the optical sensor.

The augmentor fuel control 58 is regulated by the engine control 24 to supply fuel flow as indicated in FIG. 3. When an input signal 22 indicates a desired increased thrust, control valve 28 is open wide resulting in an immediate high fuel flow rate 60. When liquid is detected by the optical sensor 40, valve 28 is throttled to obtain the metered flow 62 which then continues. Accordingly a high flow rate is achieved for sufficient time to fill the supply conduit 18 without imposing an excess flow through the spray bars. Since the conduit 18 may be filled quickly, it may be generously sized with a relatively large flow area compared to the size of the manifolds thereby avoiding the use of available pressure for passing the flow through line 18.

Optical sensor 40 may include within its system a small finite time delay to avoid the possibility of a single splash of liquid on both sides of the prism giving a false reading of the presence of liquid. Such time delay would only be in the order of a few tenths of a second.

It is further noted that the prism of the fiber optic sensor is located with face 50 transverse to the fuel flow and downstream thereof. Accordingly, this face will tend to remain clear even in the presence of two phase flow until such a time as a solid liquid flow is experienced.

It is possible that the system may go into operation when the supply line 18 is not completely empty. In such a case the dashed line on FIG. 3 illustrates the operation with optical sensor 40 again responding to the presence of liquid. The small time delay occurring for filling the empty line at even this rapid rate is simply further reduced.

It can be seen that with the invention a very rapid response can be achieved at the augmentor spray bars without experiencing an over supply of fuel in the augmentor and the associated engine stalls.

We claim:

1. A fuel supply system for the augmentor of a gas turbine engine comprising:
   fuel supply means for supplying fuel under pressure;
   a plurality of augmentor spray bars located in the engine gas stream;
   at least one manifold supplying said spray bars;
   conduit means for conveying fuel from said fuel supply means to said manifold;
   valve means for modulating the fuel flow quantity;
   means for determining the desired fuel flow to the augmentor;

sensing means for sensing the presence of liquid, located in said supply manifold area; and control means for providing a high fuel flow in response to the absense of liquid at said sensing means, and for providing the desired flow in response to the presence of liquid at said sensing means.

2. A fuel supply system as in claim 2:

said sensing means comprising;

an optical liquid level sensor including a glass prism immersed in the fluid within said manifold, a light emitting source focusing light to the prism-fluid interface, and means for detecting the presence of refracted light which occurs when said fluid is liquid.

3. A fuel supply system as in claim 1:

delay means for delaying the signal of said sensing means until liquid is detected for a finite time interval.

4. A fuel supply system as in claim 2:

said prism having at least one face transverse to the flow and facing downstream.

5. A fuel supply system as in claim 2:

said conduit means having a large flow area; and
said manifold having a small flow area.

* * * * *